United States Patent [19]

Inoue

[11] Patent Number: 5,244,550

[45] Date of Patent: Sep. 14, 1993

[54] TWO LIQUID SEPARATING METHODS AND APPARATUSES FOR IMPLEMENTING THEM

[75] Inventor: Noboru Inoue, Ono, Japan

[73] Assignee: Toyota Jidosha Kabushiki Kaisha, Aichi, Japan

[21] Appl. No.: 660,063

[22] Filed: Feb. 25, 1991

[51] Int. Cl.$^5$ .............................................. C02F 1/46
[52] U.S. Cl. ................................... 204/149; 204/186; 204/188; 204/272; 204/275; 204/302
[58] Field of Search ................. 204/272, 186, 188, 149, 204/302, 275

[56] References Cited

U.S. PATENT DOCUMENTS

| 4,140,609 | 2/1979 | Zucker | 204/180 R |
| 4,200,516 | 4/1980 | Pope | 204/302 |
| 4,747,921 | 5/1988 | Bailes et al. | 204/186 |
| 4,872,959 | 10/1989 | Herbst et al. | 204/109 |
| 4,941,962 | 7/1990 | Inoue | 204/302 |
| 5,064,515 | 11/1991 | Harapanahalli | 204/151 |

FOREIGN PATENT DOCUMENTS

| 60-61016 | 9/1983 | Japan. |
| 63-91214 | 6/1986 | Japan. |
| 88/09772 | 12/1988 | PCT Int'l Appl.. |

Primary Examiner—T. Tung
Assistant Examiner—Arun S. Phasge
Attorney, Agent, or Firm—Armstrong, Westerman, Hattori, McLeland & Naughton

[57] ABSTRACT

The present invention is conceived to provide methods for efficiently separating two liquids different in sp. gr. which are in a mixed state and apparatuses for implementing them.

The present invention devised an arrangement such that between an outer cylindrical electrode doubled as an apparatus container and an inner cylindrical electrode concentrically disposed relative to said outer cylindrical electrode and set to the equal potential to that of the outer cylindrical electrode, a charging electrode is provided concentrically thereto, thereby defining not only between the aforementioned electrodes mixture liquid passage spaces for letting the mixture of two liquids flow upwardly, but a separated liquid collecting space above said mixture liquid passage spaces, and that inside the inner cylindrical electrode, there is provided a space for letting the liquid to be separated flow down which is designed to guide downwardly the liquid to be separated left after removal of the impurity liquid, with a voltage high enough to neutralize the zeta potential of impurity liquid particles in the mixture applied between the aforementioned electrodes, respectively. In this way, not only the impurity liquid particles in the mixture are got cohere together into coarse particles by dint of their intermolecular attraction, but the separated liquid which has floated up or settled down, according to the sp. gr. difference between the mixture and the coarse particles, is collected and, then, discharged.

11 Claims, 8 Drawing Sheets

5,244,550

TWO LIQUID SEPARATING METHODS AND APPARATUSES FOR IMPLEMENTING THEM

BACKGROUND OF THE INVENTION

1. Field of the Invention

The present invention relates to methods for efficiently separating two liquids like oil and water, flon and water or flon and oil, etc., which are different in sp. gr. from each other and which are in mixed state, and apparatuses for implementing them. For example, it pertains to apparatuses capable of e.g., oil-water separation of ship's bilge waste liquor or factory waste liquor, further, separation of impurity fluids from water to make it potable, etc., and in addition, it has as its objective providing two liquid separating apparatuses capable of making purification of the liquid to be separated left after removal of impurity liquid.

2. Description of the Prior Art

Well-known as techniques for separating two liquids being in mixed state are baffle plate system separating method, inclined plate separating method and coalescer system, etc. These methods are established on the basic principle that with obstacles or inclined plates installed in a flow path where the mixture passes, the two liquids are gradually separated in long time by the sp. gr. difference between them in the process of its passing through these obstacles or inclined plates.

However, since for example, in a mixture of oil and water with suspended state, ions are adsorbing on the colloidal particle surfaces of oil, a zeta potential due to the electric double layers is generated at their interfaces with aqueous liquid. Then due to the Coulomb' force resulting from this zeta potential, the oil particles are repelling each other, thereby maintaining their stable floatation. Particularly, in a low concentration oil-water mixture, the distance between the colloidal particles is long; therefore, the repulsive Coulomb's force is far larger than their intermolecular attraction. Accordingly, the separation of the two liquids from each other can not be made by the conventional physical means. Besides, in an oil-water mixture which is emulsified by mixing-in of a surface active agent, not only the oil particles are reduced in size, but the bonding potential of water and oil particles to each other is high; on this ground, the two liquid separation is, in principle, impossible by the conventional physical means only.

Further, conventional two liquid separating apparatuses merely have the two liquid separating function. Therefore, if the liquid to be separated left after removal of impurity liquid is to be again utilized, purifying treatment process by separately installed purifying apparatuses will become necessary. Thus problems have been raised not only that the treatment operation is confusing, but that the treating time is prolonged.

BRIEF SUMMARY OF THE INVENTION

The present invention has as its object providing two liquid separating methods which are applicable not only to two liquid separation of mixtures having normal concentrations but to mixtures having low concentrations or emulsified mixtures and which can be exercised at very high efficiency, and also the apparatuses for use in implementing them. Further, it has as its another object providing two liquid separating apparatuses which can also perform the treatment for purifying the liquid to be separated at the same time.

In this specification, for avoidance of confusion, the separated liquid and the liquid to be separated are defined as follows:

Separated liquid: Impurity liquid collected which has existed in small amount in the mixture, like oil in oil water mixture; it is the object to be separated and recovered.

Liquid to be separated: The liquid accounting for the most part of the mixture, like aqueous liquid in oil-water mixture; it is the liquid remaining after removal of the impurity liquid.

The two liquid separating methods of this invention which have solved the above-mentioned problems in the prior art are characterized in that the two liquid mixture, being the object to be treated, is let flow through mixture passing spaces provided in the interior of the apparatus container and while applying to the mixture of two liquids an electric field high enough to neutralize the zeta potential of the liquid particles, being the object to be separated in the mixture, thereby getting the same kind of liquid particles cohere together into coarse particles by dint of their intermolecular attraction, the separated liquid thus turned into coarse particles which has floated up or settled down, according to the sp. gr. difference between the two liquids, is collected and discharged.

The arrangement of a two liquid separating apparatus for practical exercise of one of said methods is characterized in that while between an outer cylindrical electrode doubled as an apparatus container and an inner cylindrical electrode concentrically disposed relative to said outer cylindrical electrode and set to the equal potential to that of the outer cylindrical electrode, a charging electrode electrically insulated from the aforementioned outer and inner cylindrical electrodes is concentrically installed relative thereto and between the aforementioned electrodes, mixture passing spaces for letting the mixture of two liquids flow upwardly are defined, above said mixture passing spaces, there is formed a separated liquid collecting space provided with a discharge port opened to the outside of the apparatus container and, moreover, in the inside of the inner electrode, there is provided a space for letting the liquid to be separated flow down through which the liquid to be separated remaining after removal of impurity liquid is guided out downward, and that between each of the outer and the inner cylindrical electrodes and the charging electrode, a voltage high enough to neutralize the zeta potential of the impurity liquid particles in the mixture is applied.

The separated liquid collecting space may be located outside the apparatus container; for example, it may be placed at the top or the bottom of the apparatus container or two such spaces may be provided at both the top and the bottom thereof. Besides, as an electrode positioned on the opposite side of the outer cylindrical electrode, relative to the charging electrode interposed therebetween, for forming an electric field between it and the charging electrode, any electrode other than the inner cylindrical electrode may be employed; for example, a tubular electrode having a space for letting the liquid to be separated flow down formed in its interior may be located at the center of the apparatus container.

It is also possible to radially arrange a plurality of such tubular electrodes, with respect to an approximate center of the apparatus container.

When oil-water mixture is the object to be treated, use of an AC voltage of 1–10 V/cm is preferable and particularly, when emulsified oil-water mixture is the object to be treated, use of an AC voltage of 10–50 V/cm is preferable.

When such a highly insulating mixture as flon-mixed oil, etc., is the object to be treated, because there is no fear of electrical collosion of electrodes, it is possible to use DC voltage as the charging source and as the charging voltage, an AC or DC voltage of 100–200 V/cm, or further, a superposed voltage of DC and AC voltages may be used.

The same effect as achieved by forming innumerable electrodes between the outer cylindrical electrode and the charging electrode may be realized by interposing therebetween a reticulated or the like shaped dielectric which provides multi-electrode effect.

The mixture let flow through the mixture passing space formed between the outer cylindrical electrode and the charging electrode needs to be let flow vertically through the container and, particularly from the standpoint of separating the mixture, its flow direction should preferably be upward.

Further, it is desirable to bestow this apparatus with the function of purifying the liquid to be separated by providing either one (or both) of an SS removing layer for removing fine suspended solids (hereinafter, abbreviated to SS) or (and) organics adsorbing layer in the space where the liquid to be separated remaining after removal of the impurity liquid passes through and it is still more desirable to increase the electric field intensity of the surface(s) of the SS removing layer or (and) the organics adsorbing layer by providing a porous plate electrode set to the equal potential to that of the charging electrode on the surface(s) of this SS removing layer or (and) the organics adsorbing layer in the state of being in contact therewith.

Furthermore, it should be proper to provide an interface detecting sensor for detecting the interface position of the separated liquid and the mixture liquid at a predetermined level in the separated liquid collecting space, therewith to monitor the amount of the separated liquid collected, and at the stage where the amount of the separated liquid collected has grown larger than the predetermined amount, a self-operating valve located in the discharge pipe is opened, thereby discharging the separated liquid in the separated liquid collecting space out of the apparatus container.

The separation of two liquids by the two liquid separating apparatus of this invention is performed in the following manner:

In an apparatus as claimed in claim 2, the mixture supplied from outside the apparatus container is first let flow upwardly through spaces for letting mixture flow therethrough defined between the outer cylindrical electrode and the charging electrode and between the inner cylindrical electrode and the charging electrode. In the mixture before passing the spaces for letting the mixture flow therethrough, impurity liquid particles, being the object to be separated, are floating. The liquid particles selectively adsorb cations or anions, depending on their properties; as a result, their surfaces are charged, thereby forming an electrical double layer with surrounding other liquid; therefore, they have a zeta potential. And because the surface charges on respective liquid particles have the same polarity, respective liquid particles repel each other by dint of the Coulomb's force resulting from their zeta potential, thereby maintaining their stable floatation.

Since a voltage high enough to offset the zeta potential of the liquid particles is applied between the outer cylindrical electrode and the charging electrode, the zeta potential of the liquid particles in the mixture is neutralized in the process of its passage through the spaces for letting the mixture flow therethrough; as a result, the liquid particles are got cohere together into coarse particles. The impurity liquid particles thus turned into coarse particles float up or settle down, according to the sp. gr. difference between them and the surrounding liquid, whereby the mixture is separated into the separated liquid, being mainly the impurity liquid, and the liquid to be separated remaining after removal of the impurity liquid.

The liquid, after separated, if it has lower sp. gr. than the other's, is trapped in a separated liquid collecting space located at the top of the apparatus container, thereafter to be discharged out of the apparatus container through a discharge port opened from said separated liquid collecting space; on the other hand, if the separated liquid has higher sp. gr., it is guided downward through a space for letting the liquid to be separated flow down therethrough, which is formed inside the inner cylindrical electrode, to be discharged out of the container through the bottom of the apparatus container.

Further in the two liquid separating apparatus as claimed in claim 3, while the mixture is passing between an outer cylindrical electrode and a charging electrode and between the charging electrode and a tubular electrode, the impurity liquid particles, with their zeta potential offsetted, are got cohere together into coarse particles, which then, float up or settle down, according to their sp. gr. The impurity liquid, after separated, if its sp. gr. is lower than that of the surrounding liquid, will gather in a separated liquid collecting container contiguously provided at the top of the apparatus container; on the other hand, if the sp. gr. of the impurity liquid is higher, the separated liquid will gather in another separated liquid collecting container contiguously provided at the bottom of the apparatus container. And the impurity liquid collected in this way is periodically drawn out of the separated liquid collecting container and on the other hand, the liquid to be separated, which has been left after removal of the impurity, is guided downward and discharged out of the container through a space for letting the liquid to be separated flow down which is defined inside the tubular electrode.

When, as claimed in claim 4, a plurality of tubular electrodes each having formed in its interior a space for letting the liquid to be separated flow down are radially arranged inside the outer cylindrical electrode and between the outer cylindrical electrode and the tubular electrodes, a charging electrode which is given a potential difference from that of these electrodes is concentrically installed relative to the outer cylindrical electrode and between the outer cylindrical electrode and the tubular electrodes, cohesion into coarse particles of the impurity liquid particles is effected between each one of tubular electrodes and the charging electrode and between the outer cylindrical electrode and the charging electrode and the liquid to be separated left after removal of the impurity liquid is discharged out of the container through the space for letting the liquid to be separated flow down inside each tubular electrode or through a plurality of passages. Thus the discharge of the liquid to be separated is made through a plurality of spaces for letting the liquid to be separated flow down, enabling the treatment of a large amount of mixture to be made at once, with enhanced efficiency in the two liquid separation.

Still further, when a porous dielectric having multielectrode effect is interposed between the outer cylindrical electrode and the charging electrode, the electric field intensity in every part between these two electrodes is elevated, with enhanced efficiency in the two liquid separation.

When one or both of an SS removing layer or/and an organics adsorbing layer is or are installed in the space where the liquid to be separated which is moving toward the spaces for letting the liquid to be separated flow down passes, it is possible to remove the impurity in the liquid to be separated remaining after removal of the impurity by dint of the filtering effect by the SS removing layer or/and by the static adsorptive capacity of the adsorbent, thus enabling purification of the liquid to be separated and obviating the need for installing separate purifying units besides this apparatus.

Moreover, when a porous plate electrode set to the equal potential to that of the charging electrode is installed on the surface of the SS removing layer or the organics adsorbent layer in the state of being in contact therewith, the electric field intensity is elevated everywhere in the SS removing layer or in the organics adsorbent layer, thereby enabling enhancement of the filtering effect; furthermore, the impurity liquid particles, which have been got cohere together into coarse particles, are attracted to the surface of the SS removing layer or the organics adsorbing layer by dint of the Coulomb's force, thereby enabling formation of a cake layer on the surface; thus, the filtering effect the cake layer has is added to the original filtering effect of the SS removing layer or the organics adsorbing layer, thereby enabling the filtration at high precision.

Still more, when the apparatus is designed to have an arrangement such that with liquid level sensor for detecting the interfacial level between the separated liquid and the other liquid installed, a self-operating valve is opened, to discharge the separated liquid, when the liquid level has reached the predetermined level, the discharge of the separated liquid may be automated, thereby enabling automation of the two liquid separating operation.

BRIEF DESCRIPTION OF THE DRAWINGS

FIG. 1 (b) is a cross-sectional view of this embodiment;

FIG. 4 (b) is an enlarged longitudinal sectional view of the essential part of this embodiment;

DETAILED DESCRIPTION OF PREFERRED EMBODIMENTS

Figure 1A:
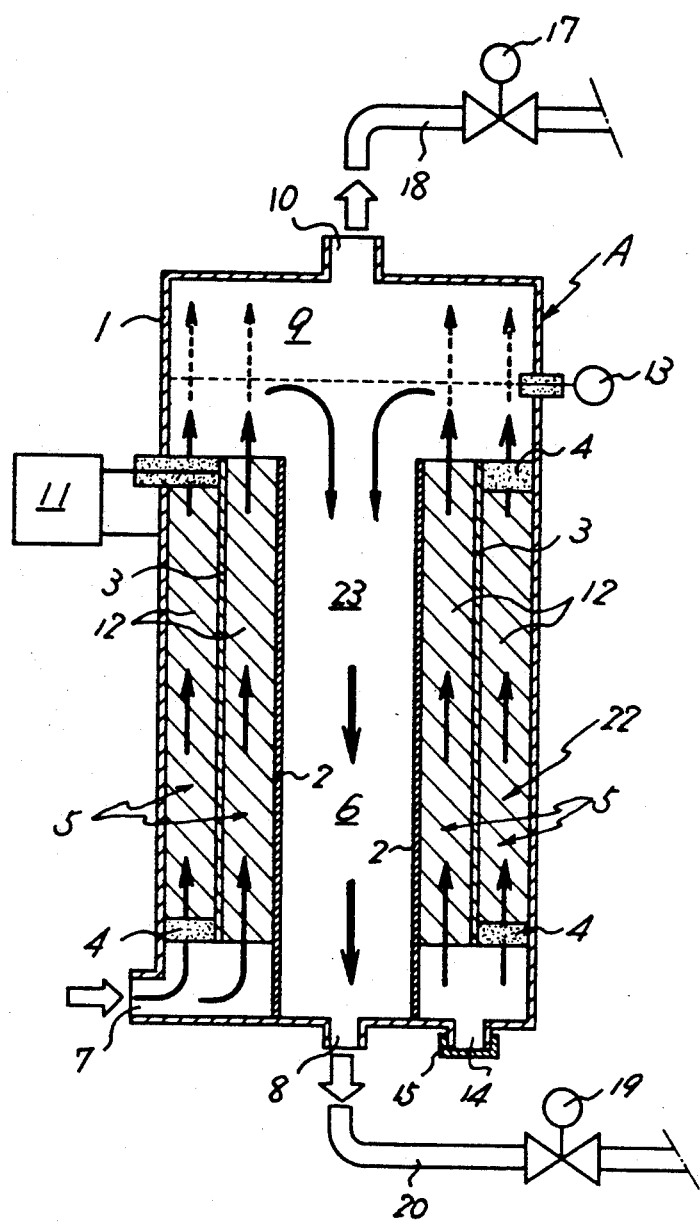
FIG. 1 (a) is a longitudinal sectional view showing the most basic embodiment of the two liquid separating apparatus of this invention.
Figure 1B:
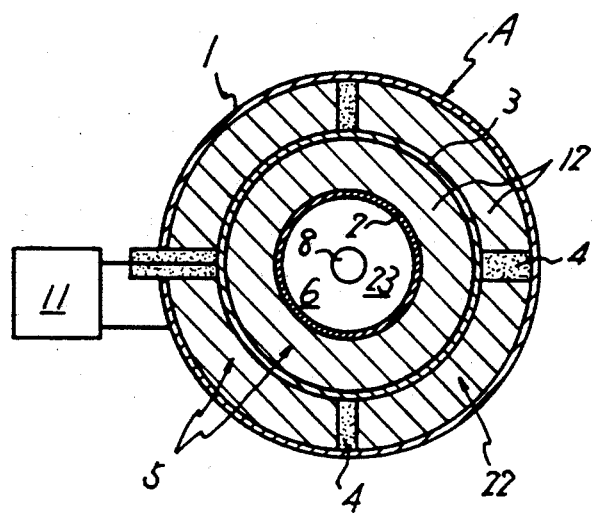

In the following, the present invention will be described in detail in connection with preferred embodiments thereof represented by the accompanying drawings: FIG. 1 (a) is an explanatory longitudinal sectional-view showing the most basic embodiment of the two liquid separating apparatus of this invention and FIG. 1 (b) is a cross-sectional view of the same embodiment.

In this view, 1 denotes an outer cylindrical electrode doubled as an apparatus container A. In the inside of said outer cylindrical electrode 1, an inner cylindrical electrode 2 set to a potential equal to that of said outer cylindrical electrode 1 is disposed concentrically therewith. And between the outer and the inner cylindrical electrodes 1 and 2, a charging electrode 3 electrically insulated from both electrodes is disposed concentrically with the outer and the inner cylindrical electrodes 1 and 2 with holders/insulaters 4, 4 interposed therebetween, thereby defining between respective electrodes mixture passage spaces 5 which permit the mixture to pass in the vertical direction, while providing inside the inner cylindrical electrode 2 a space 6 for letting the liquid to be separated flow down, which serves to guide downward the liquid to be separated which has been left after removal of the impurity liquid.

At a lower part of the apparatus container A, an inlet 7 for letting in a mixture of two liquids like oil-water mixture, etc., is opened and nearly at the center of the container bottom, a discharge port 8 for discharging the liquid to be separated, such as separated water, etc., which has been left after removal of the impurity liquid is opened. And while a space 9 for receiving the separated liquid which has been separated and has floated up is formed at the upper part of the interior space of the container body A, an outlet 10 for discharging the separated liquid is provided at the top of the container.

The inner cylindrical electrode 2 is set to the equal potential to that of the outer cylindrical electrode 1 by holding and fixing its bottom on the bottom surface of the apparatus container A and the charging electrode 3 disposed between these two electrodes concentrically therewith is given a potential difference from both electrodes, this potential difference being given by connecting one of the output terminals of the source means to the outer cylindrical electrode 1, and the other terminal to the charging electrode 3.

When the object to be treated is a mixture having a high electric resistance like a mixture of flon and oil, etc., either DC or AC source may be employed for the source means, but if the electric resistance is low, as is the case with oil-water mixture, there is a possibility that electrolytic corrosion might occur and, therefore, use of AC source is preferable.

The voltage to be impressed may be set at a voltage high enough to offset the zeta potential of the impurity liquid particles to be separated in the mixture as the standard, but generally, the lower the voltage to be impressed, the smaller the electric resistance of the mixture. For example, for oil-water mixture, an AC voltage of 1–10 V/cm is used, and for a mixture having a high electric resistance like a mixture of flon and oil, an AC voltage of 100–200 V/cm is employed. And the voltage to be applied is influenced by the state of the mixture. For example, in the case of oil-water mixture emulsified by mixing therein a surface active agent, etc., the bonding potential between oil and water particles is high; therefore, the voltage to be applied needs to be set at 10-500 V/cm. If the electric resistance of the mixture is small, there is a possibility that the electrode might be electrolytically corroded, when DC voltage is used, and therefore, AC voltage needs to be used. However, for mixtures having large electric resistances, DC voltage or superposed voltage of AC and DC voltages may be employed. Particularly, when superposed voltage of DC and AC voltages is used, the separation efficiency may be enhanced by elaborately selecting the combination of these two voltages.

In this figure, 12 designates a reticulated or the like shaped porous dielectric arranged between the outer cylindrical electrode 1 and the charging electrode 3 and between the inner cylindrical electrode 2 and the charging electrode 3; as such a dielectric, such a resin as glass wool or polypropylene, etc., is used. The dielectric 12 arranged in the spaces between the respective electrodes is polarized by the electric field applied between the respective electrodes, thereby exhibiting multi-electrode effect, which makes it possible to more efficiently neutralize the zeta potential of the impurity liquid particles in the mixture passing the mixture passage spaces defined between the respective electrodes.

In this figure, reference numeral 13 is an interface detecting sensor disposed at a predetermined level in the space 9 for receiving the separated liquid, which detects the fact that the interface between the two liquids has reached the predetermined level by detecting the difference between the electric conductivities of the two liquids or the difference between their sp.gr.'s. Further, as shown in this figure, reference numeral 14 is a residual liquid drain for discharging the oil-water mixture remaining in the mixture passage spaces 5, when the operation of this apparatus is stopped. It is closed by a cover 15, while this apparatus is in operation.

Figure 2:
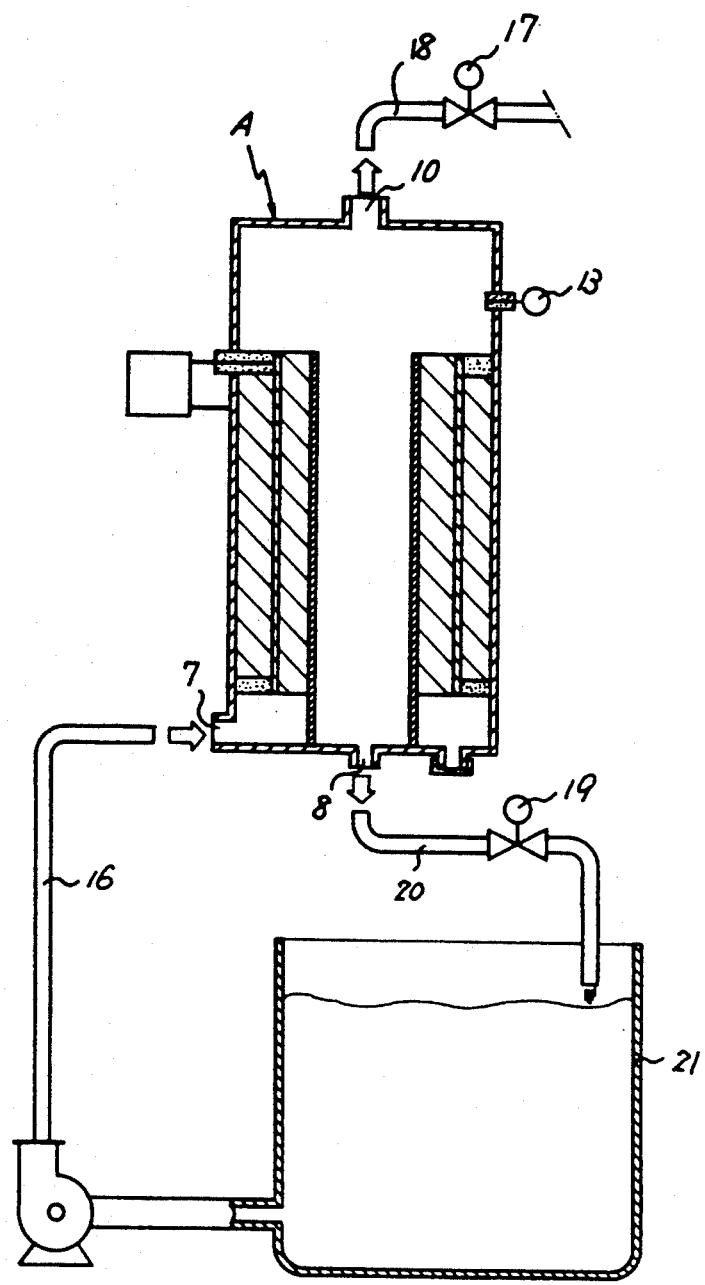
FIG. 2 is an explanatory diagram illustrating a mode of operation of this embodiment.

In operating the two liquid separating apparatus arranged as hereabove described, for example, as shown in FIG. 2, an inlet pipe 16 is connected to the mixture inlet 7 and while a top discharge pipe 18 provided with a self-operating valve 17 which is opened or closed, based on the information from the interface detecting sensor 13, is connected to the separated liquid discharge port 10 provided at the top of the container body A, a bottom discharge pipe 20 provided with a self-operating valve 19 is connected to the outlet 8 for discharging the liquid to be separated. A mixture is introduced under pressure into the apparatus container A through the mixture inlet 7, to separate it into two liquids. Then while recovering the impurity liquid through the top discharge pipe 18, the liquid to be separated which has been left after removal of the impurity is recovered into a liquid tank 21 through the bottom discharge pipe 20. Thereafter, the two liquid separation treatment is repetitively performed by again refluxing the liquid to be separated, which has been recovered, into the apparatus container interior through the aforementioned mixture inlet 7, thereby making the separation of liquids with higher purities.

The separation into two liquids in the interior of such a two liquid separating apparatus is performed in the following manner: In the undermentioned embodiment, the description is taken, with an oil-water mixture as the object to be treated; however, it goes without saying that other mixtures may be treated similarly, if only the two liquids of the mixture to be treated have difference in sp.gr.

As shown in FIG. 1 (a), first, the oil-water mixture is introduced under pressure through the mixture inlet 7 located at a side bottom of the apparatus container. In the oil-water mixture before introduced under pressure into this apparatus, colloidal particles forming electrical double layers with water are floating, said colloidal particles repelling each other due to the Coulomb's force produced by the zeta potential resulting from the electrical double layers.

Since the bottom of the inner cylindrical electrode 2 is fixed to the apparatus container bottom plate, thereby disecting the space inside the apparatus container into the external space 22 and the internal space 23, which are interposed by the inner cylindrical electrode 2, the mixture flowing in through the mixture inlet 7 passes the mixture passage spaces 5 as upward flows, as shown by arrows in FIG. 1.

Because an AC voltage is impressed between the outer cylindrical electrode 1 and the charging electrode 3 and between the inner cylindrical electrode 2 and the charging electrode 3, the dielectric 12 interposed between the respective electrodes is polarized in the electric field direction, such that the state of the mixture passing space 5 is in substance identical to that of a large number of electrodes being arranged adjacent to each other. Then the oil particles in the mixture passing as an upward flow through the space being turned into the state of multielectrodes are charged on their surfaces corresponding to the charge in the space, whereby the electrical double layers are broken and, as a result, the Coulomb's repulsion attributable to the zeta potential which has caused repulsion and floatation of oil particles disappears. Consequently, due to the intermolecular attraction, the oil particles mutually cohere together into coarse particles. After their cohesion, they float up due to the difference in sp.gr. from the aqueous liquid. The oil part accumulates as an upper layer in the separated oil receiving space 9 formed at the top of the apparatus container and with passage of time, the thickness of said oil layer grows larger, thereby pushing down the oil-water interface.

The falling-down of the level of this oil-water interface is being monitored by an interface detecting sensor 13 mounted on the inside surface of the apparatus container. As the oil-water interface goes down below the preset in the detector section of the interface detector sensor 13, a signal is sent out from the interface sensor 13; then, according to said signal, the self-operating valve 17 installed in the line of the top discharge pipe 18 is opened, thereby discharging the oil part to outside the apparatus container.

On the other hand, the aqueous liquid left after separation of the oil part, passes as a down-flow through the space for letting the liquid to be separated flow down which is defined by the internal space 23, to be discharged to outside the container through the drain port 8 for the liquid to be separated which is opened at the bottom of the apparatus container. Substantial amount of the oil-water mixture may be separated merely by its once passing through this apparatus. In order to further reduce the concentration of the oil part in the aqueous liquid thus separated, however, it is preferable, as shown in FIG. 2, to again reflux the aqueous liquid discharged through the drain port 8 for the liquid to be separated into the apparatus container A through the mixture inlet 7 and repeat the above-mentioned oil-water separation a plural number of times.

For the purpose of making sure of the effect of this invention, the present inventor composed an integrated system shown in FIG. 2, using the apparatus shown in FIG. 1 and conducted 3 types of experiment for confirmation of the effect of oil-water separation achieved by this integrated system. In these experiments, the distance between the outer cylindrical electrode 1 and the charging electrode 3 and the distance between the charging electrode 3 and the inner cylindrical electrode 2 are respectively set to 25 mm, and the inflow of the water to be treated into this apparatus to 5 l per min. As the dielectric to be interposed between the electrodes, a reticulated fabric made of polypropylene was used. The number of cycles given in the side column is that of the repetitive passing of the water through this apparatus.

EXPERIMENT 1

With an unrefined liquid of turbine oil IS056 having 30,000 ppm water content as the object to be treated, experiments on removing the water content in said water containing oil were conducted.

The experiments were conducted in the following manner:

1 No dielectric was placed between the electrodes and no voltage was applied.

2 No dielectric was placed between the electrodes and an AC voltage of 25V, 60 Hz was applied between respective electrodes.

3 A dielectric was interposed between the electrodes and an AC voltage of 25V, 60 Hz was applied between respective electrodes.

The results are as exhibited in Table 1:

TABLE 1

|  | Unrefined liquid | 1 cycle | 2 cycles | 3 cycles | (Unit: ppm) 5 cycles |
|---|---|---|---|---|---|
| No charging, without dielectric | 30,000 | 25,140 | 20,120 | 15,620 | 11,520 |
| Charging 25V AC, without dielectric | 30,000 | 20,560 | 10,230 | 5,416 | 876 |
| Charging 25V AC, with dielectric | 30,000 | 11,230 | 3,110 | 1,342 | 192 |

This table clarifies that when a voltage is applied between electrodes, more excellent dehydration effect is achieved than when no voltage is applied. Especially when a dielectric is interposed between the electrodes, extremely excellent dehydration effect is obtained. It is evident that with a voltage applied, the dehydration effect is remarkably enhanced, as the number of cycles of repetitive passing of the water through this apparatus is increased further and further.

EXPERIMENT 2

With an oil containing water having 5% oil content as the object to be treated, experiments on separating the oil content in said oil containing water were conducted. The experiments were conducted in the following manners, as in Experiment 1:

1 No dielectric was placed between the electrodes and no voltage was applied.

2 No dielectric was placed between the electrodes and an AC voltage of 25V, 60 Hz was applied between respective electrodes.

3 The dielectric was interposed between the electrodes and an AC voltage of 25V, 60 Hz was applied between respective electrodes.

The results are as shown in Table 2:

TABLE 2

|  | Unrefined liquid | 1 cycle | 2 cycles | 3 cycles | (Unit: %) 5 cycles |
|---|---|---|---|---|---|
| No charging, without dielectric | 5.0 | 4.3 | 3.9 | 3.2 | 3.0 |
| Charging 25V AC, without dielectric | 5.0 | 2.1 | 1.2 | 0.6 | 0.1 |
| Charging 25V AC, with dielectric | 5.0 | 1.7 | 0.8 | 0.4 | 0.05 |

Table 2 clarifies that when the voltage is applied, the oil-water separation effect achieved is higher than when no voltage is applied. When the dielectric is interposed between the electrodes, the oil-water separation effect achieved is higher than when no dielectric is interposed therebetween.

EXPERIMENT 3

With an oil containing water having 5% emulsified oil content as the object to be treated, experiments on separation of emulsified oil content in said oil containing water were conducted.

The experiments were conducted in the following manners:

1 No dielectric was placed between the electrodes and no voltage was applied.

2 No dielectric was placed between the electrodes and an AC voltage of 25V, 60 Hz was applied between respective electrodes.

3 No dielectric was placed between the electrodes and an AC voltage of 50V, 60 Hz was applied between respective electrodes.

The results are as shown in Table 3:

TABLE 3

|  | Unrefined liquid | 1 cycle | 2 cycles | 3 cycles | (Unit: %) 5 cycles |
|---|---|---|---|---|---|
| No charging, without dielectric | 5.0 | 5.0 | 5.0 | 5.0 | 5.0 |
| Charging 25V AC, without dielectric | 5.0 | 5.0 | 4.8 | 4.5 | 4.5 |
| Charging 50V AC, without dielectric | 5.0 | 4.2 | 3.8 | 3.2 | 2.5 |

This table clarifies that when no voltage is applied, the emulsified oil content can hardly be separated even by increasing the number of cycles of repetitive treatment; in contrast, when voltages are impressed, deemulsification of the oil content enables separation of oil content. Particularly, it is clear that under emulsified state, the bonding potential of oil and water particles is high and, therefore, it is advantageous to use higher voltage. Accordingly, it is apparent that high voltage should be employed, when complete de-emulsification of oil content is required; on the other hand, that low voltage should be used, if part of emulsified oil content is desired to be left.

Figure 3A:
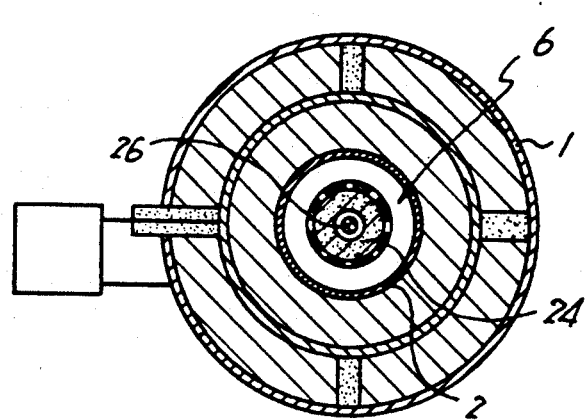
FIGS. 3 (a) and (b) are explanatory views showing another embodiment.
Figure 3B:
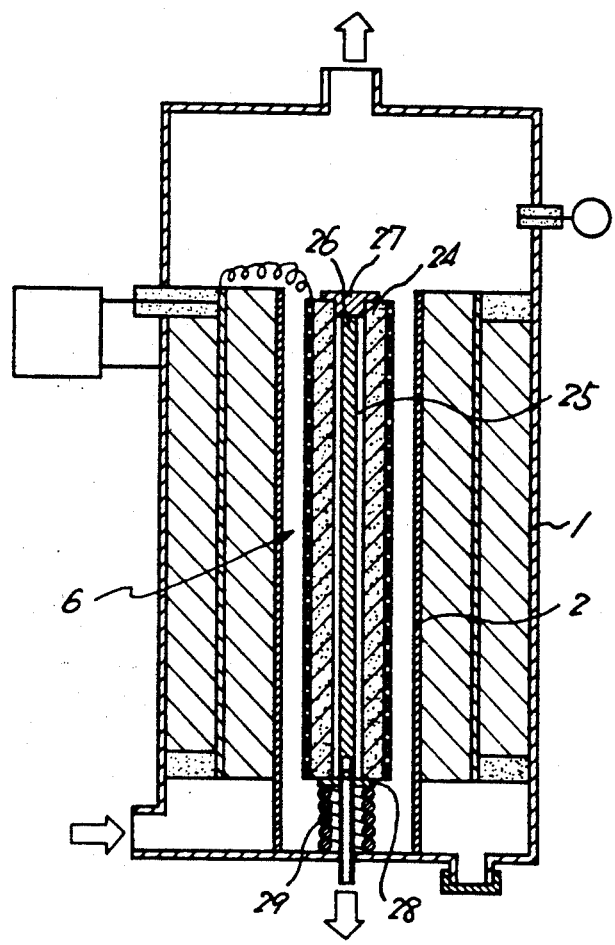

In the apparatus shown in FIG. 3, a cylindrical SS removing filter 24 is installed in the space 6 for letting the liquid to be separated flow down for the purpose of removing SS particles from the aqueous liquid obtained by oil-water separation. The filter 24 for removal of SS is cylindrical, has at its center a hole 25 for letting the liquid to be separated flow down and is firmly held in place in the following way: A central electrode 26 set to a potential equal to that of the outer and the inner cylindrical electrodes 1 and 2 is inserted in the hole 25 for letting the liquid to be separated flow down and while pressing the top of the SS removing filter by an upper flange 27 located on the top of the aforementioned central electrode 26, a ringed lower flange 28 is put on the lower part of the central electrode 26 and this lower flange 28 is pressed onto the bottom surface of the SS removing filter by means of a compression spring 29, thereby securing the filter.

Figure 4A:
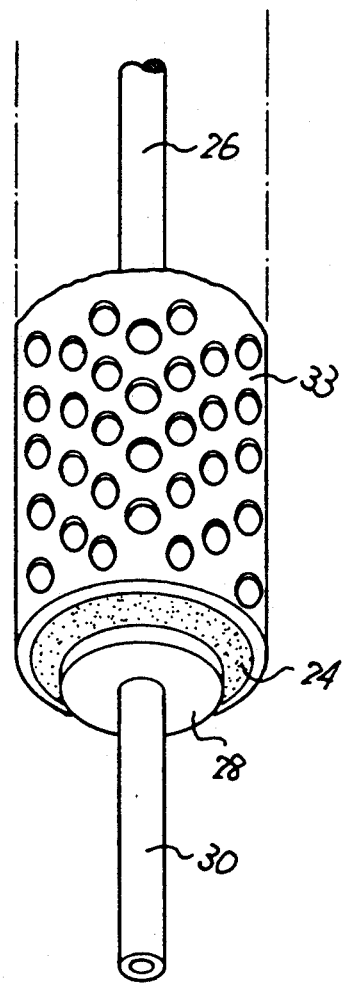
FIGS. 4 (a) and (c) are enlarged perspective views of the essential parts of this embodiment.
Figure 4B:
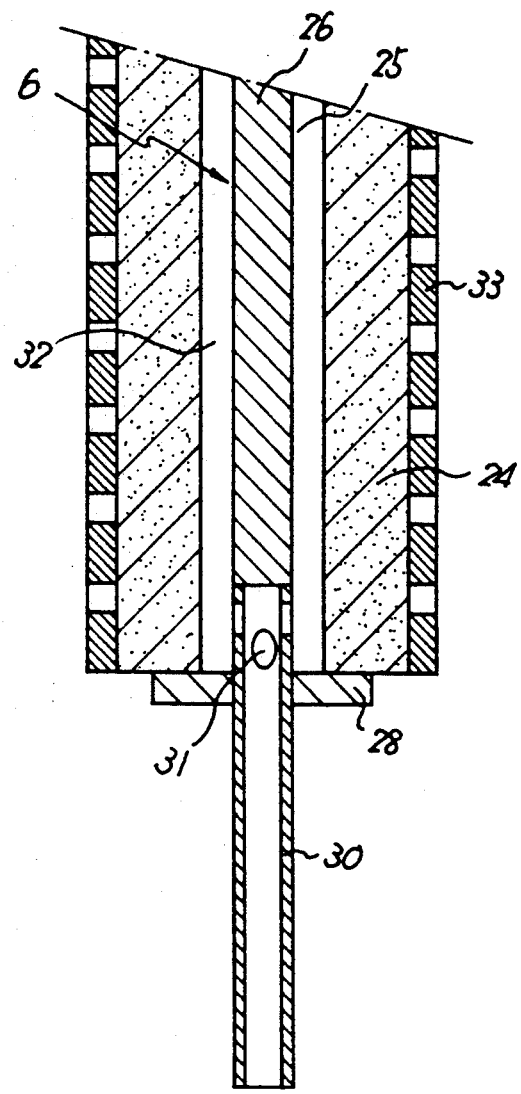
Figure 4C:
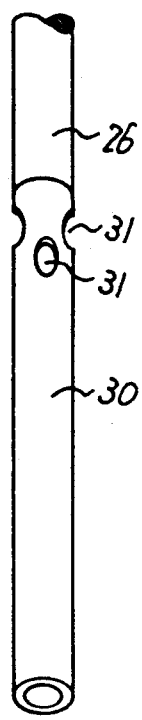

The lower part of the central electrode 26 is formed hollow, as shown in FIG. 4 (b), with an inlet 31 opened through a side of the upper part of the hollow pipe 30, so that the aqueous liquid which has passed the SS removing filter 24 flows down through a clearance 32 between the SS removing filter 24 and the central electrode 26 and, thereafter, goes into the hollow pipe 30 through said inlet 31, to be led out of the container.

As the SS removing filter 24, a reticulated dielectric fabric made of polypropylene, etc., as its material is desirable from the viewpoint of high dielectric constant and chemicals resistance, but other materials may arbitrarily be employed.

The surface of the SS removing filter 24 is surrounded by a porous plate electrode 33 set to the equal potential to that of the charging electrode 3 and through the perforations of the porous plate electrode 33, the aqueous liquid left after the separation is led into the SS removing filter 24. By equalizing the potential of the surface of the SS removing filter with that of the charging electrode 3, the surface charge of the SS removing filter 24 is increased, whereby not only the cohesion into coarse particles of the SS particles is effected by neutralizing the zeta potential of the SS particles, but the SS particles turned into coarse particles are captured on the surface of the SS removing filter by dint of the Coulomb's force and the liquid flow's action, thereby forming a cake layer of SS particles. In this way, even when a filter having large meshes are used as the SS removing filter, stuffing of the filter may be prevented, for the benefit of prolonged service life of the filter.

Figure 5:
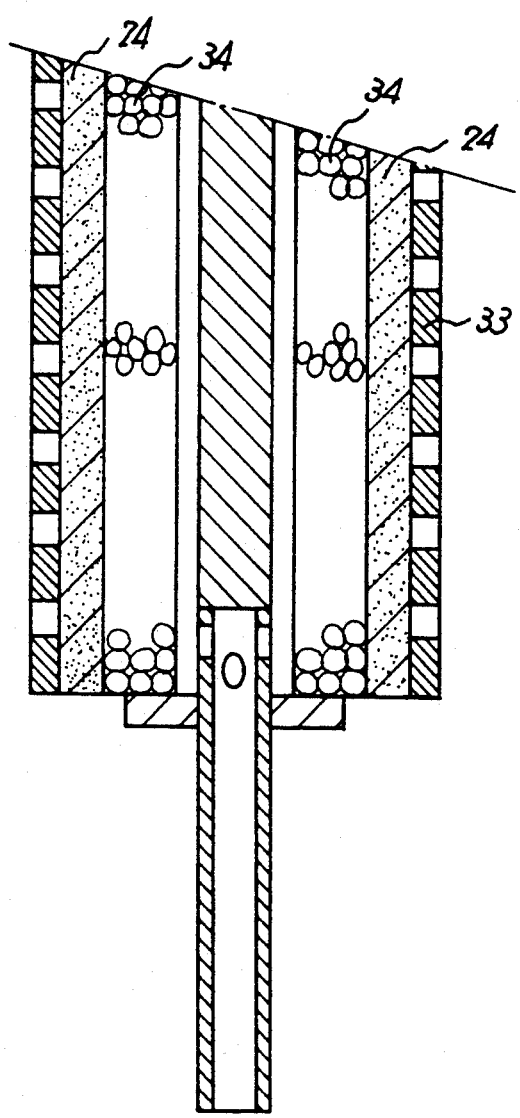
FIG. 5 is an enlarged longitudinal sectional view of another embodiment.

Particularly, if the object to be treated is factory waste liquor, it is also preferable to provide the filter in a double-layered structure by providing on the inner surface of the SS removing filter 24 an organics adsorptive layer 34, as shown in FIG. 5, which is capable of removing organics in the aqueous liquid for upgrading the BOD value (biochemical oxygen demand) and the COD value (Chemical Oxygen Consumption) of the aqueous liquid separated. As the adsorbent which constitutes the organics adsorptive layer 34, fibrous active carbon, granular active carbon, zeolite and further chelate resins, etc., may be used. Especially, use of chelate resins exhibits excellent adsorbability against metallic dust.

Figure 6A:
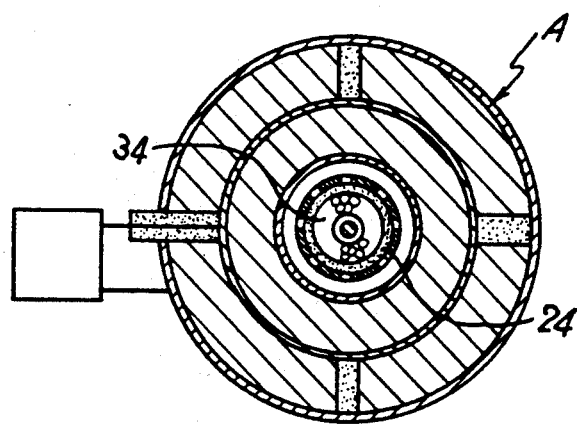
FIGS. 6 (a) and (b), FIGS. 7 (a) and (b), FIGS. 8 (a) and (b), FIGS. 9 (a) and (b), FIGS. 10 (a) and (b) and FIGS. 11 (a) and (b) represent other embodiments.
Figure 6B:
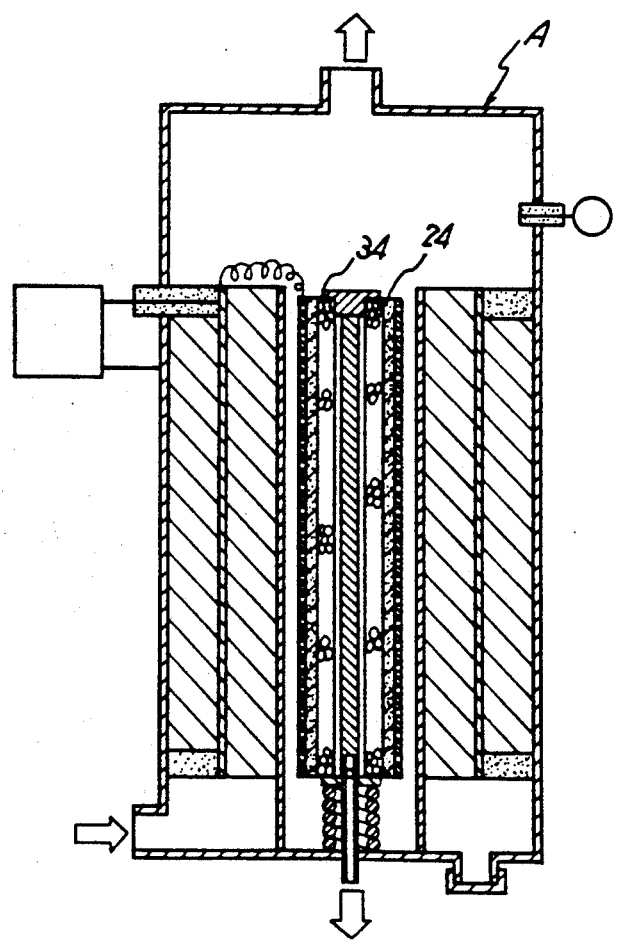

The apparatus of FIG. 6 shows its state of being equipped with the filters of the aforementioned double layer structure in the apparatus container A. According to this embodiment, not only the removal of SS particles in the aqueous liquid left after removal of oil content may be performed, but improvement in the BOD and COD values of the aqueous liquid can be simultaneously effected, so that if said apparatus is put to use for treatment of factory waste liquor, this will contribute to prevention of environmental pollution by factory waste liquor.

The apparatuses disclosed by FIGS. 1–6 have as their object recovering by separation a liquid having lower sp.gr. of the liquids of the mixture. Each of the apparatuses represented by FIGS. 7–11 is capable of recovering by separation whichever liquid having lower or higher sp.gr. of the liquids of the mixture is the object to be recovered by separation, its arrangement being characterized in that it is provided, separately at the upper and the lower parts of the apparatus container A, with separated liquid collecting containers 39 and 40 having outlets 35 and 36 and interface detecting sensors 37 and 38 placed at predetermined levels in their interiors, respectively.

Figure 7A:
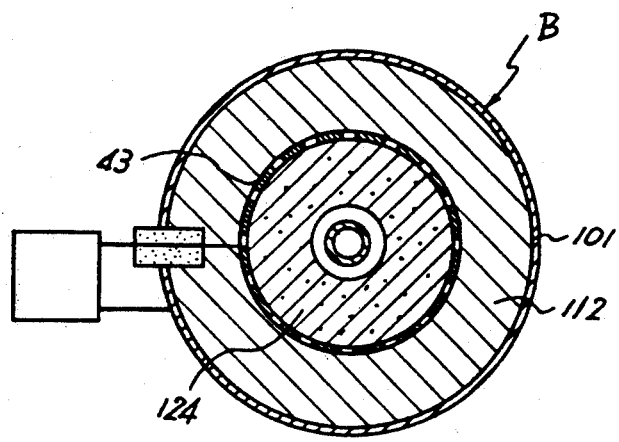
Figure 7B:
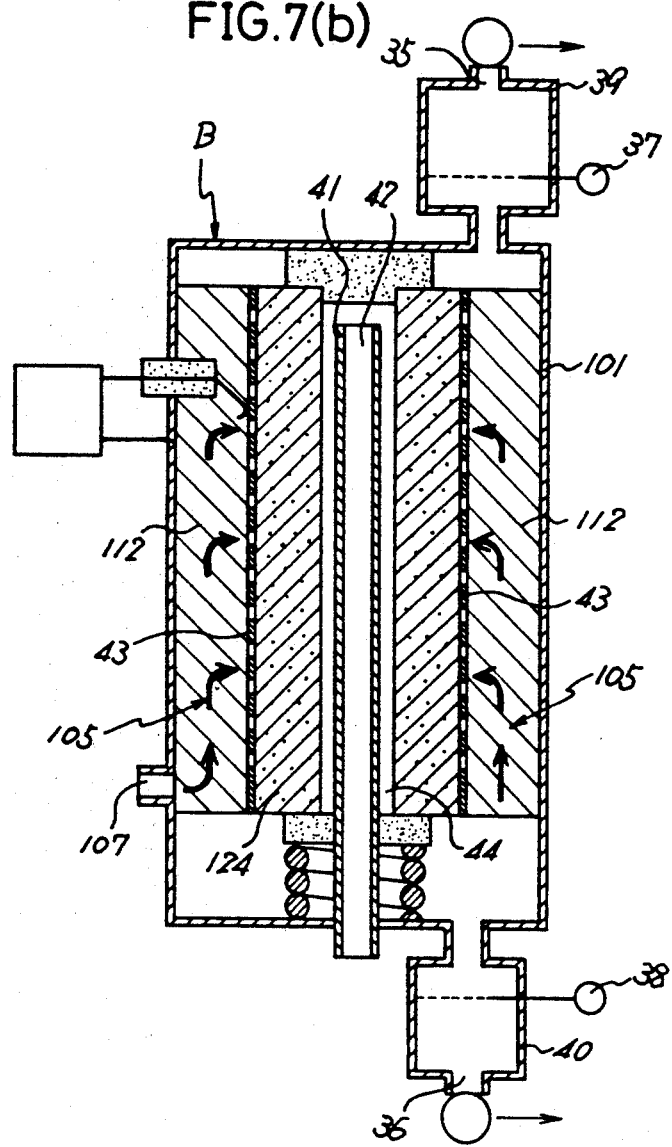

The apparatus of FIG. 7 is constituted such that at the axial center position of an apparatus container B doubled as an outer cylindrical electrode, a tubular electrode 41 set to the equal potential to that of the outer cylindrical electrode 101 is arranged, said tubular electrode 41 being opened at its top 42, and its bottom projected out of the apparatus container, piercing the bottom thereof, and that between the aforementioned outer cylindrical electrode 101 and the tubular electrode 41, there is arranged a porous charging electrode 43 to which is given a potential difference from the potential of the outer cylindrical electrode 101 and the tubular electrode 41. And it is further constituted such that in the mixture passage space 105 defined between the outer cylindrical electrode 101 and the porous charging electrode 43, a reticulated or the like shaped dielectric 112 having multielectrode effect is placed and that on the inner surface of the porous charging electrode 43, an SS removing filter 124 is arranged, with a clearance 44 provided between it and the surface of the tubular electrode 41.

According to this embodiment, while simultaneously as the mixture flowing in through the mixture inlet 107 is passing upwardly through the mixture passage space 105, it is flowing into the SS removing filter 124 through the perforations of the porous charging electrode 43, whereby not only the impurity liquid particles are got cohere together into coarse particles by dint of the multi-electrode effect of the dielectric 112, but SS particles in the mixture are removed by the SS removing filter 124. And in this process, the liquid having a lower sp.gr. of the liquids of the mixture is floated up, to be gathered in the separated liquid collecting container 39 at the top of the apparatus container; on the other hand, when the object to be recovered by separation is a liquid having a higher sp.gr. of the liquids of the mixture, this liquid is settled down, to be gathered in the separated liquid collecting container 40 located at the bottom of the container.

The discharge and recovery of the separated liquid is performed by opening-closing of the self-operating valves provided at the respective discharge openings, in accordance with the information from the interface sensor 37 installed in the separated liquid collecting container 39, when the lower sp.gr. separated liquid of the liquids of the mixture is the object to be recovered, and in accordance with the information from the interface sensor 38 in the separated liquid collecting container 40 installed at the bottom of the apparatus container, when the higher sp.gr. separated liquid is the object to be recovered. The separated liquid collecting container may be installed only at either one of the top or the bottom of the apparatus container B, but if they are placed at both the top and the bottom of the apparatus container B, as shown in this figure, whichever operation may be made, whether the object liquid to be separated has a low or high sp.gr., in correspondence therewith.

Figure 8A:
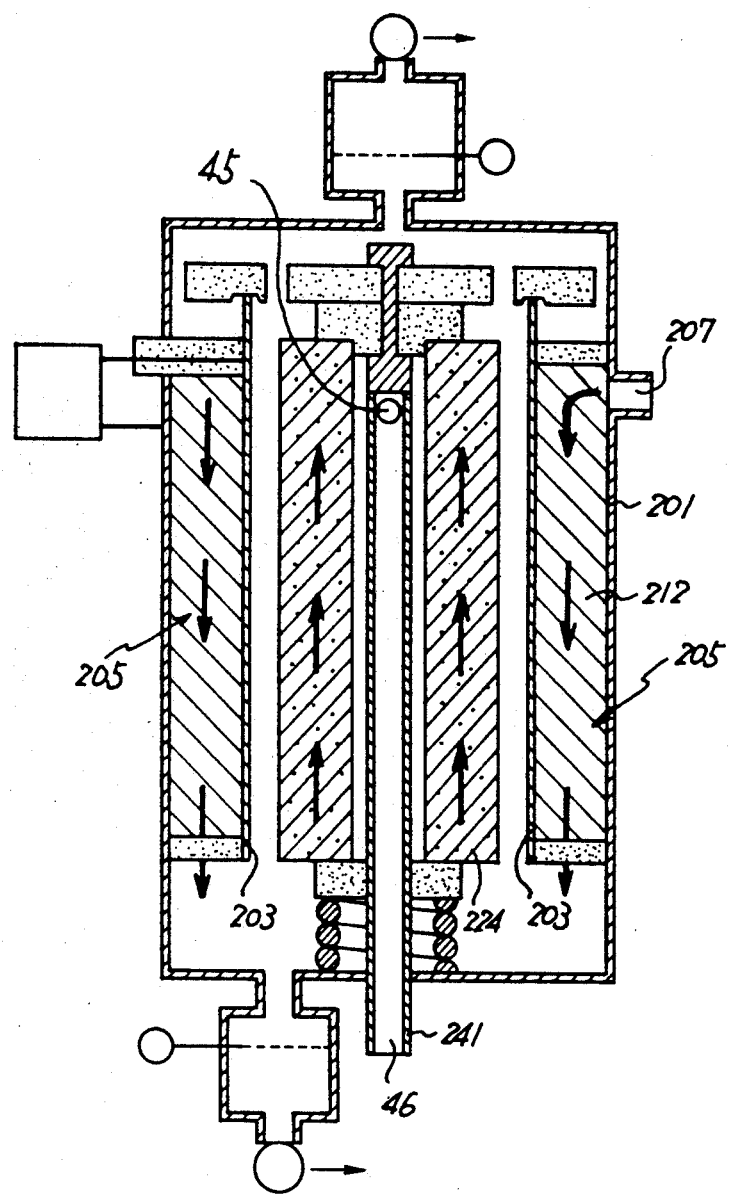
Figure 8B:
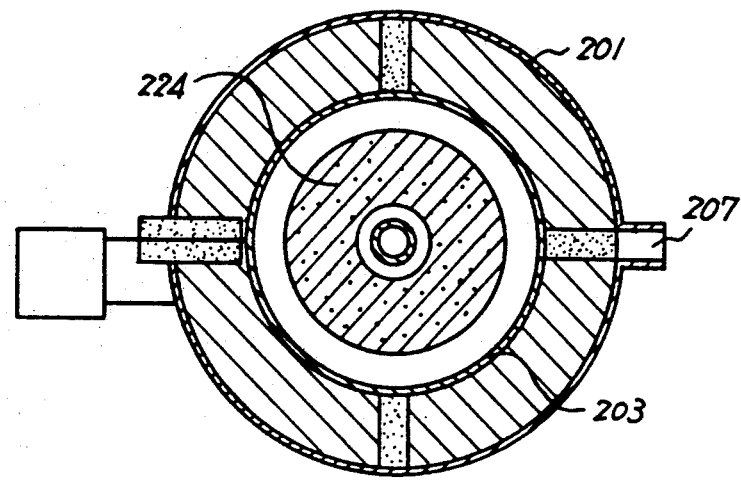

The apparatus of FIG. 8 illustrates an arrangement in which as the tubular electrode, a tubular electrode 241 closed at its top and with an inlet 45 for letting the liquid to be separated flow in formed through its side is used, between an outer cylindrical electrode 201 and the tubular electrode 241, a charging electrode 203 having a potential difference from the potential of both electrodes is located, and while a mixture passage space 205 having a dielectric 212 arranged therein is formed between the outer cylindrical electrode 201 and the charging electrode 203, a cylindrical SS filter 224 is arranged between the charging electrode 203 and the tubular electrode 241, with clearances provided between it and both electrodes, and, further, a mixture inlet 207 is provided at the upper part of the apparatus container. In this instance, the mixture introduced under pressure into this apparatus container passes the mixture passage space 205 as a down flow, thereafter, turns its flow upward at the apparatus container bottom, then, passes through the SS removing filter 224, reaching the inlet 45 at the top of the tubular electrode 241; in this process, separation into two liquids of the mixture and purification of the liquid to be separated is performed, then, the liquid to be separated, after purified, comes through the aforementioned inlet 45 into the tubular electrode 241, to pass through the space 46 for letting the liquid to be separated flow down and, thereafter, it is discharged out of the container through the apparatus container bottom. According to this embodiment, long time is taken for the treatment of mixture, because of the long liquid passage, but the separation into two liquids and the purification of the liquid to be separated can be at high accuracy.

Figure 9A:
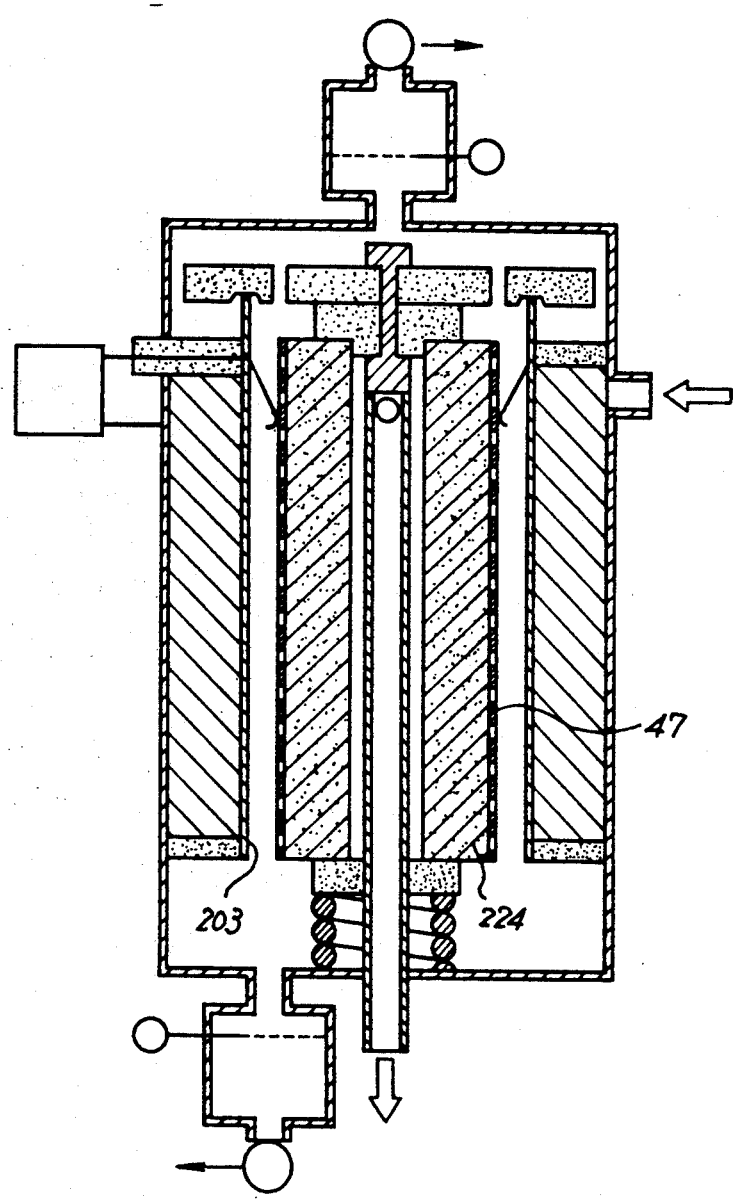
Figure 9B:
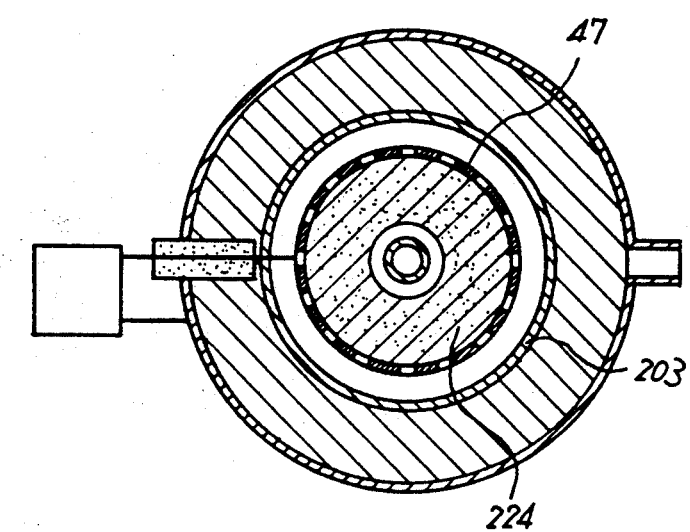

The apparatus of FIG. 9 illustrates an arrangement of the apparatus disclosed by FIG. 8 with a porous plate electrode 47 set to the equal potential to that of the charging electrode 203 and which is arranged on the surface of the SS removing filter 224 in contact therewith. The porous plate electrode 47 arranged in this way increases the surface charge of the SS removing filter 224, so that the SS particles made coarse is captured, thereby forming a cake layer on the filter surface, as intended.

Figure 10A:
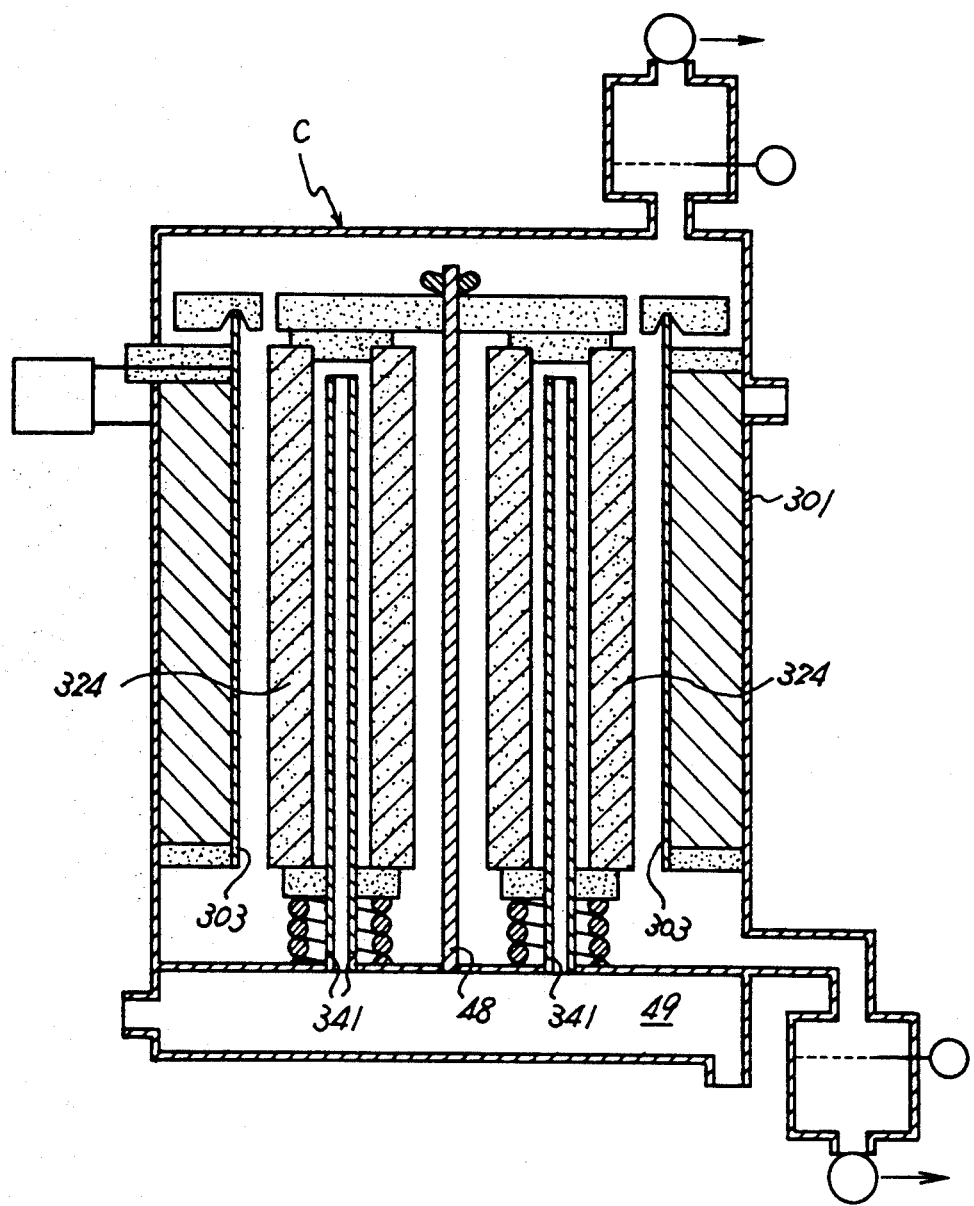
Figure 10B:
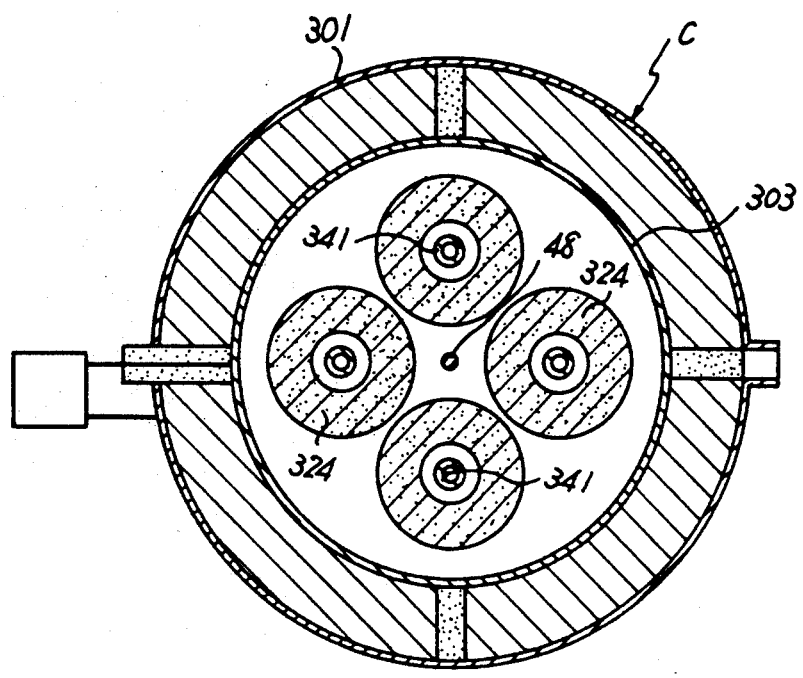
Figure 11A:
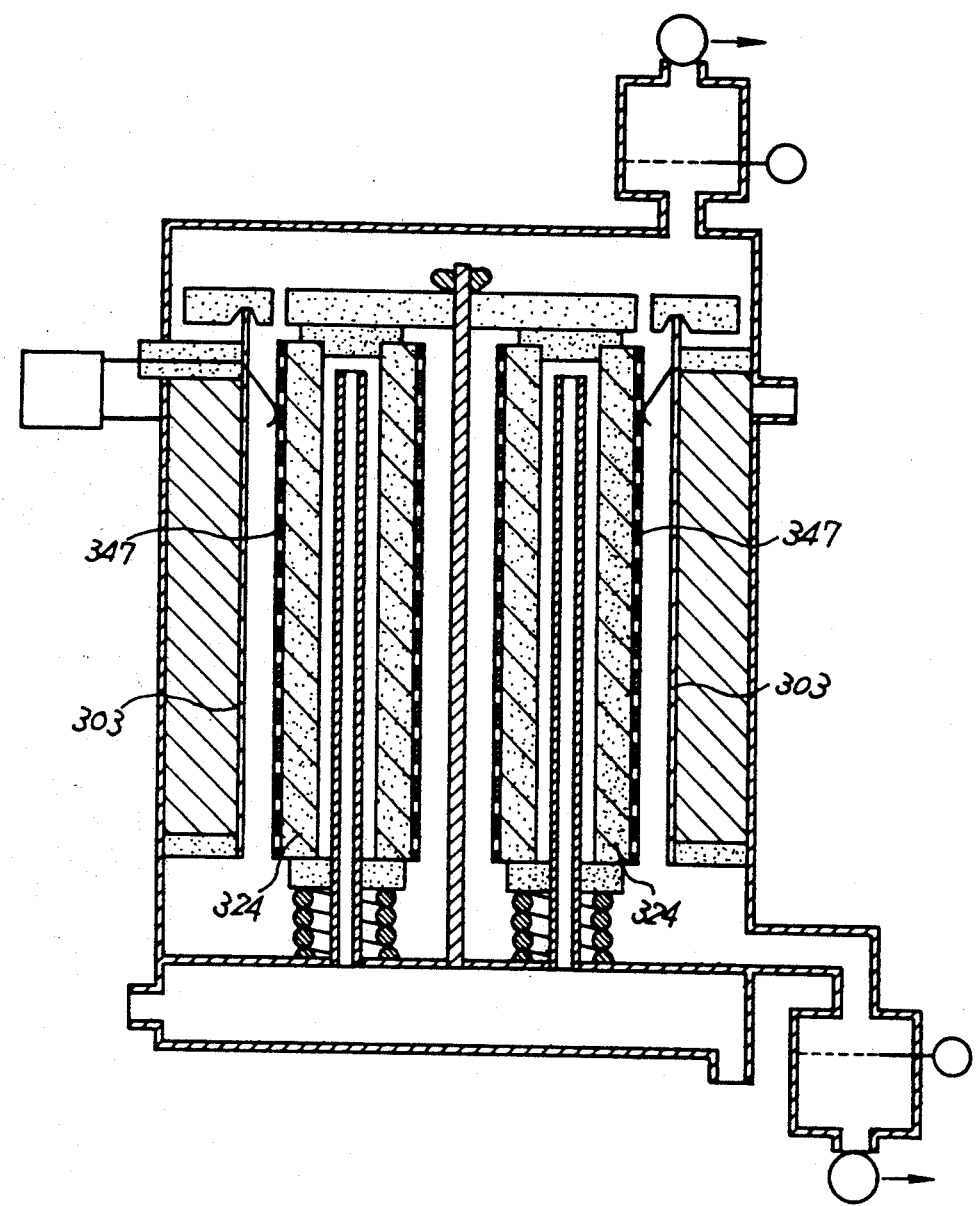
Figure 11B:
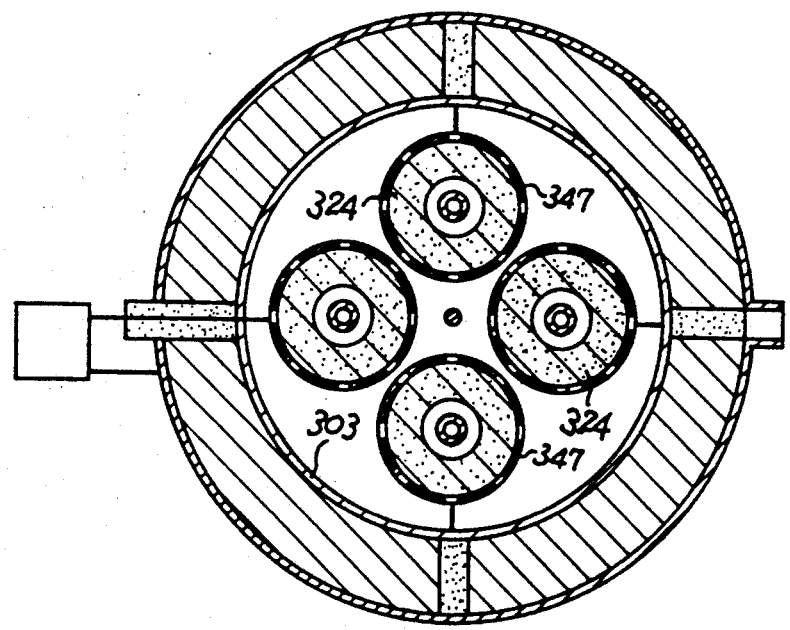

While in the above-described apparatus, the tubular electrode is disposed at the center of the apparatus container and the SS removing filter is arranged concentrically to the outer cylindrical electrode, the tubular electrodes, SS removing filters and organics adsorbent layers may be radially arranged, as shown in FIGS. 10 and 11, with the apparatus container center as the center of the plurality of tubular electrodes.

The apparatus of FIG. 10 illustrates an arrangement in which inside an apparatus container C doubled as an outer cylindrical electrode 301, a charging electrode 303 is concentrically arranged relative thereto at a position separated at a definite distance therefrom and while a central electrode 48 set at the equal potential to that of the outer cylindrical electrode 301 is disposed at the center of the apparatus container, in the space between the charging electrode 303 and the central electrode 48, a plurality of tubular electrodes 341 are radially arranged with respect to the aforementioned central electrode 48 as their center and each of the respective tubular electrodes 341 is externally provided with a cylindrical SS removing filter 324. Each of the tubular electrodes 341, 341 . . . is set to the equal potential to that of the outer cylindrical electrode 301 and the central electrode 48 and at the bottom of the apparatus container C, there is provided a space 49 for letting gather the liquid to be separated which is discharged from the bottom of the tubular electrode, after flowing down through the space in the tubular electrode, so that the liquid to be separated which has passed through the respective tubular electrodes may be summarily discharged from the bottom of the container. According to this embodiment, a plurality of SS removing filters 324, 324 . . . are radially arranged, for the benefit of increased surface area of the filter, thereby permitting a large amount of the mixture to be treated at once, so that a two liquid separating device with purifying function which operates at very high treating efficiency may be provided.

The apparatus of FIG. 11 shows that of FIG. 10 in which on the surface of each of the SS removing filters 324, 324 . . . , being radially disposed, a porous plate electrode 347 set to the equal potential to that of the charging electrode 303 is arranged in the state of being in contact therewith.

As hereabove-described, the two liquid separating apparatuses shown in FIGS. 1-11 are capable of separating all two liquids including oil-water mixture, mixture of flon and water, further, mixture of flon and oil, etc., or any mixtures of two liquids which are different in sp.gr.

With the two liquid separating apparatus of this invention constituted as hereabove-described, the mixture may be separated into the separated liquid and the liquid to be separated merely by introducing the mixture of two liquids into this apparatus container under pressure. Moreover, this apparatus is applicable to emulsified mixtures which could not be separated by the conventional baffle plate system, etc., and can exhibit very high separability.

Besides, when either one or both of the SS removing filter or/and organics adsorptive layer is or are disposed in the space where the liquid to be separated passes, the purification of the liquid to be separated left after separation of impurity liquid may be performed with the same apparatus.

According to the two liquid separating method of this invention, the two liquid mixture, being the object to be treated, is passed through the mixture passage spaces defined in the interior of the apparatus container; then, the two liquid mixture is positioned in an electric field, thereby the zeta potential of the impurity liquid particles, being the object to be separated in said mixture, is neutralized, thereby getting the impurity particles cohere together into coarse particles by dint of their intermolecular attraction; then, the coarse particles which have floated up or settled down, according to their sp.gr., are collected and discharged as the separated liquid. In this way, any mixture of liquids differing in sp.gr. like oil and water, flon and water or flon and oil, etc., may be separated at high efficiency. Thus according to this invention, the zeta potential of the impurity liquid particles is neutralized thereby getting the impurity liquid particles cohere together into coarse particles by dint of their intermolecular attraction. On this account, separation of emulsified mixtures of two liquids, which could not be separated by the conventional physical methods like baffle plate system, is possible.

The two liquid separating apparatus according to claim 2 embodying this method is designed to have an arrangement such that between outer and inner cylindrical electrodes, a charging electrode electrically insulated from both electrodes is located; then, while a mixture passage space is defined between the outer cylindrical electrode and the charging electrode, at the top of said mixture passage space, a separated liquid receiving space provided with a discharge port opened to the outside of the apparatus container is formed and inside the inner cylindrical electrode, there is provided a space for letting the liquid to be separated flow down which is designed to guide downward the liquid to be separated left after separation of the impurity liquid, and that between one of the outer and the inner cylindrical electrodes and the charging electrode, respectively, a voltage high enough to neutralize the zeta potential of the impurity liquid particles is applied. Accordingly, with this apparatus, it is possible to separate the mixture of liquids into the separated liquid and the liquid to be separated merely by introducing under pressure the mixture into the apparatus container and, further, while the separated liquid is collected in the separated liquid receiving space, the liquid to be separated is discharged out of the apparatus container from its bottom, for facility in recovering the separated liquid and the liquid to be separated.

As claimed under claim 3, if at either one of the upper or the lower part (or both) of the apparatus container, a separated liquid collecting container(s) is (or are) installed, this will facilitate recovery of the separated liquid. Particularly, if the separated liquid collecting containers are installed both at the top and the bottom of the container, it will offer an apparatus adaptable for treating whichever of the two liquids in the mixture, either one of them having a lower sp.gr. or the other having a higher sp.gr.

And as claimed under claim 4, if a tubular electrode having a space for letting the liquid to be separated flow down formed in the interior thereof is used in place of the inner cylindrical electrode and a plurality of said tubular electrodes are radially disposed, with respect to the center of the apparatus, it is possible to treat a large amount of mixture at once, for the benefit of achieving great improvement in the efficiency of treatment.

Further, if a reticulated or the like shaped porous dielectric having multi-electrode effect is arranged between the outer cylindrical electrode and the charging electrode, the electric field intensity of every part between the outer cylindrical electrode and the charging electrode may be elevated, thereby promoting the cohesion of impurity liquid particles into coarse particles.

And if an SS removing layer and an organics adsorptive layer are provided in the places where the liquid to be separated which is moving toward the space for letting the liquid to be separated flow down passes, it is possible to purify in this apparatus the liquid to be separated left after separation of the impurity liquid particles, thereby putting the separated liquid discharged from this apparatus to reuse as it is.

Furthermore, if a porous plate electrode set to the equal potential to that of the charging electrode is arranged on the surface of the SS removing layer or the organics adsorptive layer, the SS particles in the liquid to be separated which have cohered together into coarse particles are captured by attraction to the surface of the SS removing layer or the organics adsorptive layer by dint of the Coulomb's force, thereby forming a cake layer of SS particles on the surface, said cake layer, then, functioning as a filter. Accordingly, not only the filtration precision is drastically improved, but the filter meshes are prevented from blinding, because relatively coarse SS particles are removed by the aforementioned cake layer, for the benefit of ensuring long service life of the apparatus.

Besides, with a sensor for detecting the interface between the separated liquid and the mixture fitted in a space for collecting the separated liquid, the amount of the separated liquid is monitored at all times, so that when the amount exceeds the predetermined amount, the self-operating valve located at the separated liquid discharge port is to be opened, thereby to automatically discharge the separated liquid; in this way, a totally automatic two liquid separating apparatus which requires no manual operation may be offered.

I claim:

1. A two liquid separating method, comprising the steps of:

providing a separator tank into which a mixed liquid is fed, said separator tank having a lower discharge port for discharging one liquid, an upper discharge port for discharging the other liquid, an outer vertical wall which serves as an electrode, an innermost vertical wall defining an interior space and which serves as an electrode, and an intermediate vertical wall disposed between said outer vertical wall and said innermost vertical wall, said intermediate vertical wall also serving as a charging electrode; a first mixture passage space being bounded by said outer vertical wall and said intermediate vertical wall and a second mixture passage space being bounded by said innermost vertical wall and said intermediate vertical wall; said inner cylindrical electrode being disposed so that it surrounds the lower discharge port so that said lower discharge port communicates only with said interior space;

providing a voltage source charging said outer vertical wall to a first predetermined potential, said innermost vertical wall to said first predetermined potential, and said intermediate vertical wall to a second predetermined potential which is different from said first predetermined potential, thereby creating an electric field;

passing a mixture of two liquids to be treated through said first and second mixture passage spaces provided in an interior of said separator tank, while applying an electric field to said mixture sufficiently large to neutralize the zeta potential of impurity liquid particles in said mixture, thereby causing the impurity liquid particles to cohere together into coarse particles by their intermolecular attraction; and collecting and discharging the separated liquid which has been turned into coarse particles which have been separated by one of floating up and settling down according to the difference in specific gravity between these particles and the remaining liquid of said mixture.

2. A two liquid separating apparatus including an apparatus container, comprising:

the apparatus container having an inlet port for receiving a liquid mixture, an upper discharge port for discharging a first liquid separated from said liquid mixture, and a lower discharge port for discharging a second liquid from said liquid mixture;

a vertically disposed outer cylindrical electrode which is an outer wall of the apparatus container;

a vertically disposed inner cylindrical electrode concentrically arranged within said outer cylindrical electrode, which bounds an interior space of the apparatus container such that said lower discharge port communicates directly only with said interior space;

a vertically disposed charging electrode electrically insulated from said outer and inner cylindrical electrodes, and which is concentrically arranged relative to said outer and inner cylindrical electrodes, such that a first mixture passage space is bounded by said outer cylindrical electrode and said charging electrode, and a second mixture passage space is bounded by said inner cylindrical electrode and said charging electrode; said inner cylindrical electrode being disposed so that it surrounds said lower discharge port so that said lower discharge port communicates only with said interior space;

a separated liquid collecting space at an upper portion of said apparatus container adjacent said upper discharge port; said interior space guiding downward the liquid to be separated which is left after separation of the impurity liquid; and a voltage supply for charging said outer cylindrical electrode in a first predetermined potential, said inner cylindrical electrode to said first predetermined potential, and said charging electrode to a second predetermined potential different from said first predetermined potential, thereby creating an electric field, said electric field being sufficiently high to neutralize the zeta potential of the impurity liquid particles in the mixture which flows within said first and second mixture passage spaces.

3. The two liquid separating apparatus, as claimed in claim 2, wherein an AC voltage of 1–10 V/cm is used as the charging voltage and oil-water mixture is taken as the object to be treated.

4. The two liquid separating apparatus, as claimed in claim 2, wherein an AC voltage of 10–50 V/cm is used as the charging voltage and an emulsified oil-water mixture is taken as the object to be treated.

5. The two liquid separating apparatus, as claimed in claim 2, wherein an AC or DC voltage of 100–200 V/cm is used as the charging voltage and mixture liquids having low conductivities are taken as the object to be treated.

6. The two liquid separating apparatus, as claimed in claim 2, wherein a porous dielectric having a multi-electrode effect is interposed between the outer cylindrical electrode and the charging electrode.

7. The two liquid separating apparatus, as claimed in claim 2, wherein one of an SS removing layer and an organics adsorptive layer is provided in said interior space where the liquid to be separated passes which is left after removal of the impurity liquid.

8. The two liquid separating apparatus, as claimed in claim 2, wherein a porous plate electrode set to potential which is equal to that of said charging electrode is placed on the surface of one of an SS removing layer and an organics adsorptive layer so as to be in contact therewith.

9. The two liquid separating apparatus, as claimed in claim 2, further comprising an interface detecting sensor for detecting the interface between the two liquids and a self-operating valve operable in response to an output of said interface detecting sensor, said self-operating valve being disposed in the separated liquid discharge path, and said interface detecting sensor being installed in the space for collecting the separated liquid, to monitor the amount of the separated liquid collected and to automatically discharge the separated liquid by controlling said self-operating valve according to the information obtained by said interface detecting sensor.

10. A two liquid separating apparatus including an outer cylindrical electrode serving as an apparatus container, comprising:

the apparatus container having an inlet port for receiving a liquid mixture, an upper discharge port for discharging a first liquid separated from said liquid mixture, and a lower discharge port for discharging a second liquid from said liquid mixture;

a tubular electrode having therein a passage for letting the liquid to be separated flow down which is designed to guide the flow-down of the liquid to be separated after removal of the impurity liquid is concentrically disposed relative thereto, between said outer cylindrical electrode and said tubular electrode;

a charging electrode electrically insulated from both electrodes is concentrically provided relative thereto and defining mixture passage spaces for letting the mixture of two liquids flow in the vertical direction between the aforementioned respective electrodes;

a separated liquid collecting container or containers each provided with a discharge port are provided contiguously at either one or both of the top or-/and the bottom of the apparatus container; and voltage supply means for providing a voltage high enough to neutralize the zeta potential of the impurity liquid particles in the mixture between both of said outer cylindrical electrode and said charging electrode, respectively.

11. A two liquid separating apparatus including an outer cylindrical electrode serving as an apparatus container, comprising:

the apparatus container having an inlet port for receiving a liquid mixture, an upper discharge port for discharging a first liquid separated from said liquid mixture, and a lower discharge port for discharging a second liquid from said liquid mixture;

a plurality of tubular electrodes each having formed in the interior thereof a space for letting the liquid to be separated flow down which is designed to guide the flow-down of the liquid to be separated after removal of the impurity liquid are radially arranged relative to the container, between said outer cylindrical electrode and said plurality of tubular electrodes;

a charging electrode electrically insulated from these electrodes is concentrically installed relative to the outer cylindrical electrode, thereby forming mixture passage spaces for letting the mixture of two liquids flow vertically between the aforementioned respective electrodes;

a separated liquid collecting container or containers each provided with a discharge port are provided contiguously at either one or both of the top or-/and the bottom of the apparatus container; and voltage supply means for providing a voltage high enough to neutralize the zeta potential of the impurity liquid particles in the mixture between both of said outer cylindrical electrode and said plurality of tubular electrodes and said charging electrode, respectively.

* * * * *